United States Patent
Sharma (10) Patent No.: US 9,032,167 B2
(45) Date of Patent: *May 12, 2015

(54) WRITE OPERATIONS TO AND FROM MULTIPLE BUFFERS

(71) Applicant: Comcast Cable Communications, LLC, Philadelphia, PA (US)

(72) Inventor: Niraj K. Sharma, Cupertino, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/139,118

(22) Filed: Dec. 23, 2013

(65) Prior Publication Data

US 2014/0189266 A1 Jul. 3, 2014

Related U.S. Application Data (63) Continuation of application No. 13/360,064, filed on Jan. 27, 2012, now Pat. No. 8,639,894.

(51) Int. Cl.
  *G06F 12/02* (2006.01)
  *G06F 9/30* (2006.01)
  *G06F 12/06* (2006.01)
  *G06F 9/00* (2006.01)

(52) U.S. Cl.
  CPC .............. *G06F 9/3004* (2013.01); *G06F 12/06* (2013.01); *G06F 9/00* (2013.01)

(58) Field of Classification Search
  USPC ................... 711/157, 5, 151, 168; 360/63, 64
  See application file for complete search history.

(56) References Cited

U.S. PATENT DOCUMENTS

| | | | |
|---|---|---|---|
| 4,389,681 A * | 6/1983 | Tanaka et al. | 360/27 |
| 5,623,622 A | 4/1997 | Yuki et al. | |
| 5,696,791 A * | 12/1997 | Yeung | 375/244 |
| 5,903,310 A * | 5/1999 | Finotello et al. | 375/240.25 |
| 6,131,138 A * | 10/2000 | Packer et al. | 711/4 |
| 6,389,571 B1 * | 5/2002 | Yang et al. | 714/766 |
| 6,437,937 B1 | 8/2002 | Guo et al. | |
| 6,941,024 B2 * | 9/2005 | Mukherjee | 382/248 |
| 7,027,647 B2 * | 4/2006 | Mukherjee et al. | 382/173 |
| 7,308,456 B2 | 12/2007 | Friske et al. | |
| 7,334,061 B2 * | 2/2008 | Raju et al. | 710/35 |
| 7,451,281 B2 * | 11/2008 | Hanks | 711/154 |
| 7,478,217 B2 | 1/2009 | Lin | |
| 7,484,028 B2 * | 1/2009 | Raju et al. | 710/310 |
| 7,555,559 B2 | 6/2009 | Chapweske | |
| 7,574,580 B2 | 8/2009 | Mahashin et al. | |
| 7,639,712 B2 * | 12/2009 | Un et al. | 370/469 |
| 7,742,644 B2 * | 6/2010 | Hwang et al. | 382/232 |
| 7,830,754 B2 * | 11/2010 | Wang et al. | 369/30.23 |
| 7,917,696 B2 | 3/2011 | Peters et al. | |
| 7,983,468 B2 | 7/2011 | Ibikunle et al. | |
| 8,098,957 B2 * | 1/2012 | Hwang et al. | 382/294 |
| 8,103,786 B2 | 1/2012 | Chapweske | |
| 2007/0162610 A1 * | 7/2007 | Un et al. | 709/230 |
| 2007/0198986 A1 | 8/2007 | Panziera | |
| 2012/0131309 A1 * | 5/2012 | Johnson et al. | 712/41 |

* cited by examiner

*Primary Examiner* — Stephen Elmore
(74) *Attorney, Agent, or Firm* — Banner & Witcoff, Ltd.

(57) ABSTRACT

Computer readable media, methods and apparatuses are disclosed that may be configured for sequentially reading data of a file stored on a storage medium. The disclosure also provides for alternating writing, in a sequential order, portions of the file data to a first buffer and a second buffer. The disclosure also provides for writing from a first buffer and a second buffer to a first track until the first track is filled.

20 Claims, 8 Drawing Sheets

WRITE OPERATIONS TO AND FROM MULTIPLE BUFFERS

CROSS-REFERENCE TO RELATED APPLICATIONS

This application is a continuation of U.S. application Ser. No. 13/360,064, filed on Jan. 27, 2012 (now U.S. Pat. No. 8,639,894), the disclosure of which is hereby incorporated in its entirety.

BACKGROUND

A communication channel between computers sending and receiving data may be a bottleneck for data transfer. One mechanism for transferring a data file from one computer to another uses multiple concurrent threads that simultaneously process different blocks of data from the file in parallel. The processed data blocks may then be sent via the communication channel.

Parallel processing, however, may cause problems, such as due to data blocks of a file being received out of order. Receiving computing devices may write the received data blocks to a storage medium in the order of receipt, which may result in the data blocks of the file being fragmented (e.g., not located sequentially) on the storage medium. To read the fragmented file, a read head may have to move from location to location on the storage medium. For example, during a seek operation, the read head may be searching for a start of the next block on the storage medium, while not reading the block data during the move. Movement of the read head from location to location on the storage medium adds to the amount of time required retrieve the file.

A further drawback of conventional systems relates to an end of file marker of the file. The end of file marker may indicate that a particular data block is a last piece of data for a file. Due to data blocks being sent concurrently, the receiving computer may receive the data block containing the end of file marker before all other data blocks of a file have been received. The receiving computer may write the data block containing the end of file marker to the storage medium, and thereafter may receive data blocks of the file that are to be written to the storage medium after receipt of the end of file marker. Writing after an end of file marker may be very complex and may have to be handled separately for different platforms, such as, for example, MAC™, WINDOWS™, and LINUX™. Improved methods and systems are needed.

SUMMARY

The following presents a simplified summary in order to provide a basic understanding of some aspects as described herein. The summary is not an extensive overview of all aspects. It is neither intended to identify key or critical elements nor to delineate the scope of the present disclosure. The following summary merely presents various example concepts in a simplified form as a prelude to the more detailed description below.

A new method, apparatus, computer readable medium, and system for reading/writing data from/to storage devices using parallel processing threads is described herein.

According to some aspects, computer readable media, methods, apparatuses, and systems are disclosed that may be configured for sequentially reading data of a file stored on a storage medium. The disclosure may also provide for alternating transferring of fixed size portions of the file data to a first buffer and a second buffer. In some aspects, the example embodiments may be configured for alternating processing of data blocks of the fixed sized portions in parallel from the first and second buffers by a plurality of processing threads, and outputting the processed data blocks.

According to some aspects, example embodiments may be configured for receiving data of a file and assigning portions of the data to each of a plurality of processing threads for processing of the assigned portions by the respective threads in parallel, each of the threads being implemented by at least one processor. In some aspects, the example embodiments may be configured for writing, by the threads in parallel, blocks of the data to a first buffer and blocks of the data to a second buffer, and alternating transferring of the data blocks in the first buffer and the data blocks in the second buffer to a storage device. In some aspects, the example embodiments may be configured for sequentially writing, by the storage device, each of the data blocks from the first buffer adjacent to one another on a storage medium.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope and spirit of the present disclosure.

Figure 1:
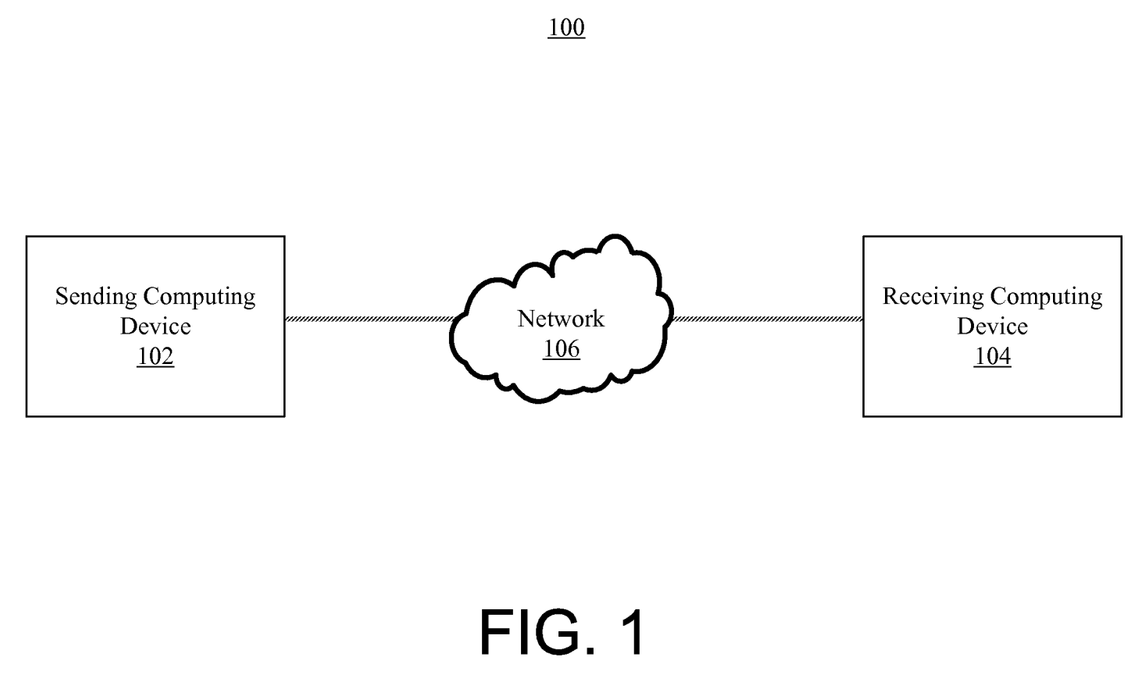
FIG. 1 illustrates a functional component diagram in accordance with example embodiments of the disclosure.

FIG. 1 illustrates a functional component diagram of an illustrative system in accordance with example embodiments of the disclosure. In one aspect, the system may be adapted for performing efficient read and write operations by a storage device using parallel threads. In one example, the system 100 may include a network 106 coupled to a sending computing device 102 (e.g., computer) and a receiving computing device 104 (e.g., computer). Network 106 may be any type of network, and may be a single network or a combination of multiple networks, such as, for example, a cable and/or fiber optic and/or satellite content distribution network, a hybrid fiber-coaxial (HFC) network, a telephone network, a wireless network and/or may be a local network or a public network such as the Internet. Example networks may include a wide area network, a local area network, a wireless network, and/or combinations thereof. Physically, network 106 may be embodied, for example, as multiple computers communicatively coupled together as a plurality of nodes in a wired and/or wireless manner. Network 106 may also be configured to transport data using a communication protocol, such as, for example, transmission control protocol/Internet protocol (TCP/IP), user datagram protocol (UDP), or other manners for transporting data via a network.

Any of the above-mentioned functional components, including sending computing device 102 and receiving computing device 104, may each be implemented, for example, as a computer or as a system or device that includes a computer. The term "computer" as referred to herein broadly refers to any electronic, electro-optical, and/or mechanical device, or system of multiple physically separate or physically joined such devices, that is able to process and manipulate information, such as in the form of data. Non-limiting examples of a computer include one or more personal computers (e.g., desktop or laptop), servers, smart phones, personal digital assistants (PDAs), television set top boxes, and/or a system of these in any combination or subcombination. In addition, a given computer may be physically located completely in one location or may be distributed amongst a plurality of locations (e.g., may implement distributive computing). A computer may be or include a general-purpose computer and/or a dedicated computer configured to perform only certain limited functions.

A computer typically includes hardware that may execute software and/or be configured in hardware to perform specific functions. The software may be stored on a computer-readable medium in the form of computer-readable instructions. In some examples, the computer-readable medium may be non-transitory. A computer may read the computer-readable instructions, and in response perform various steps as defined by those computer-readable instructions. Thus, any functions attributed to any of the functional components of FIG. 1 as described herein may be implemented, for example, by reading and executing such computer-readable instructions for performing those functions, and/or by any hardware subsystem (e.g., a processor) from which the computer is composed.

The term "computer-readable medium" as used herein includes not only a single physical medium or single type of medium, but also a combination of one or more physical media and/or types of media. Examples of a computer-readable medium include, but are not limited to, one or more memories, hard drives, optical discs (such as CDs or DVDs), magnetic discs, and magnetic tape drives.

Such a computer-readable medium may store computer-readable instructions (e.g., software) and/or computer-readable data (e.g., information that may or may not be executable). In the present example, a computer-readable medium (such as a memory) may be included in any one or more of the functional components shown in FIG. 1 and may store computer-executable instructions and/or data used by any of those functional components. Alternatively or additionally, such a computer-readable medium storing the data and/or software may be physically separate from, yet accessible by, any of the functional components shown in FIG. 1.

Figure 2:
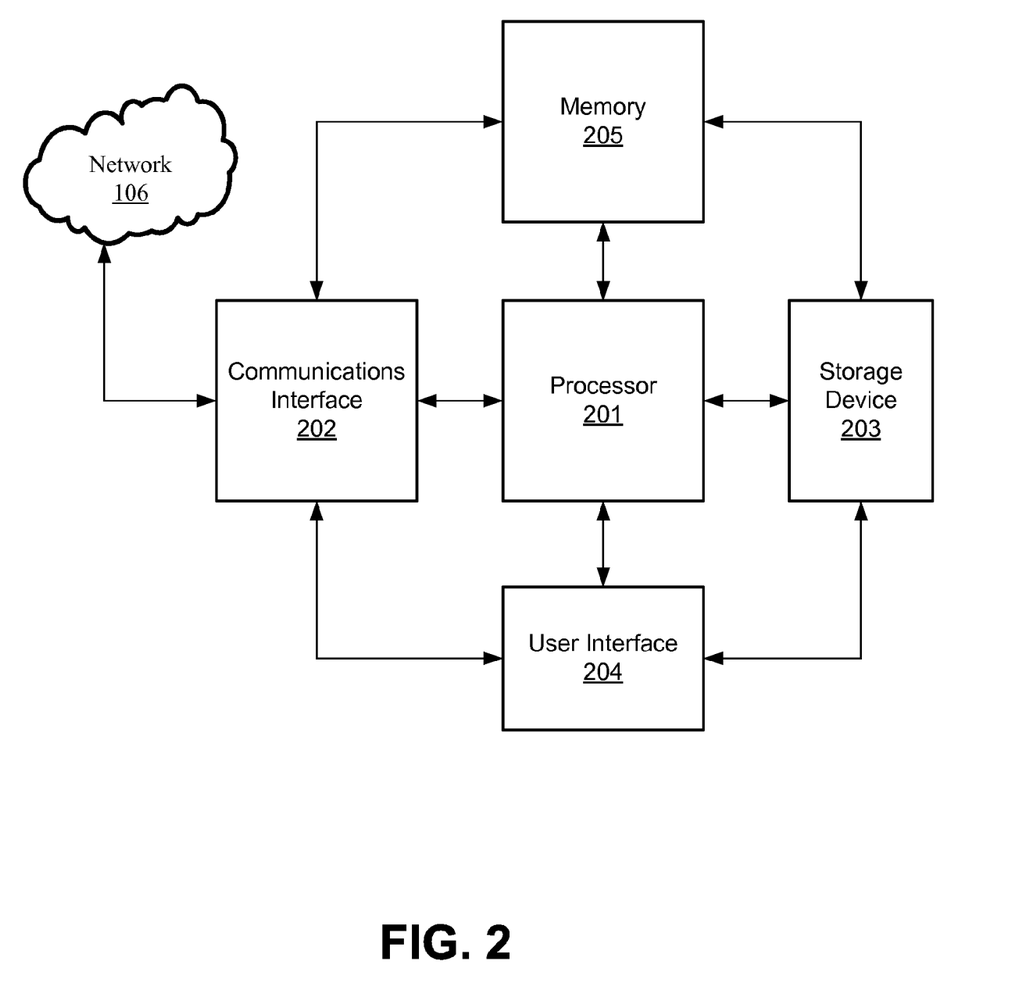
FIG. 2 illustrates a functional component diagram of an illustrative computing device in accordance with example embodiments of the disclosure.

An example functional component diagram of a computing device is shown in FIG. 2. The computing device in FIG. 2 may be sending computing device 102 coupled to network 106, may be receiving computing device 104 coupled to network 106, or other computing device. In one aspect, the computing device may include at least one processor 201, at least one communications interface 202, at least one storage device 203, at least one user interface 204, and at least one memory 205. In an example, the computer-readable medium may be embodied by storage device 203 and/or memory 205, and processor 201 may execute computer-executable instructions stored by storage device 203 and/or memory 205. The processor 201 may also be one of many processors. Communications interface 202 may provide for unidirectional or bidirectional communications with any network or device external to that computing device, such as, for example, network 106. User interface 204 may allow for unidirectional or bidirectional information transfer between the computing device and a human user, such as, for example, via a display, touchscreen, mouse, a keyboard, or other input/output device. Again, any of the functional components of FIG. 1 may be implemented as a computing device such as shown in FIG. 2.

Figure 3:
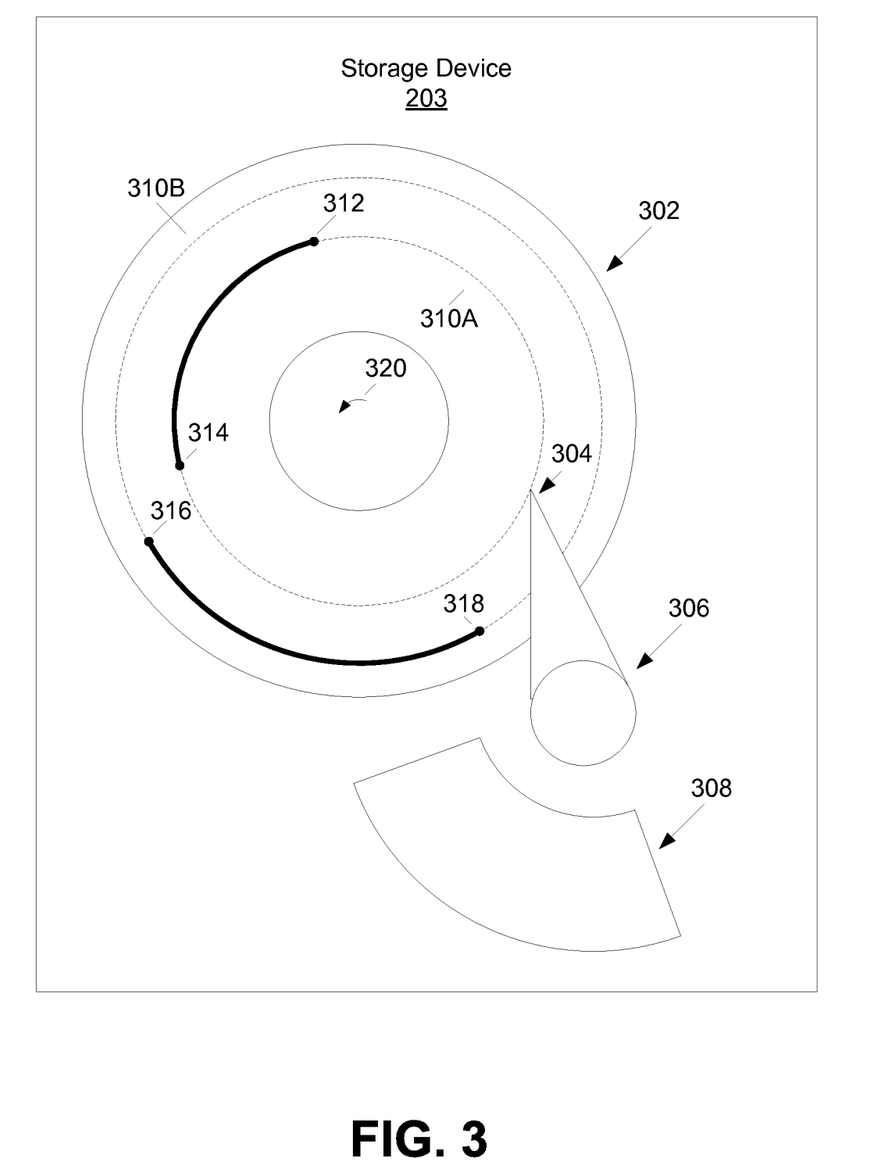
FIG. 3 illustrates a storage device in accordance with example embodiments of the disclosure.

FIG. 3 illustrates a storage device in accordance with example embodiments of the disclosure. The storage device 203 may include a recording medium 302 (e.g., storage medium), a read/write head 304, an actuator arm 306, and an actuator 308. The storage device 203 may be, for example, a hard disk drive of a computing device. The recording medium 302 may be a platter which may be magnetically encoded with data by the read/write head 304. For simplicity, only a single recording medium 302 and only a single read/write head 304 are shown; however, the storage device 203 may include two or more recording mediums and two or more read/write heads. For example, the storage device 203 may include an array of stacked platters each having a read/write head 304. Other types of storage devices may also be used, such as those permitting writing and/or playback of data.

In an example, the recording medium 302 may store data in circularly shaped tracks. Two tracks 310A-B are shown on the recording medium 302 using dashed lines, but the recording medium 302 may include more than two tracks. Each track 310 may be composed of one or more sectors that are assigned unique identifiers. To read and/or write data to a particular sector, the storage device 203 may use a unique identifier of the particular sector to determine a beginning location of the sector (e.g., track and starting position of the sector within the track). The storage device 203 may rotate the recording medium 302 and position the read/write head 304 at the beginning location of the sector to write and/or read the stored data. For example, a first sector may begin at reference numeral 312 of track 310A and a second sector may begin at reference numeral 316 of track 310B. To prevent excessive and/or inefficient movement of the read/write head 304, the computing device 102 and/or 104 may include a multi-buffer arrangement for efficient read/write operations to/from a storage device of file data processed by parallel threads, as described below.

Figure 4:
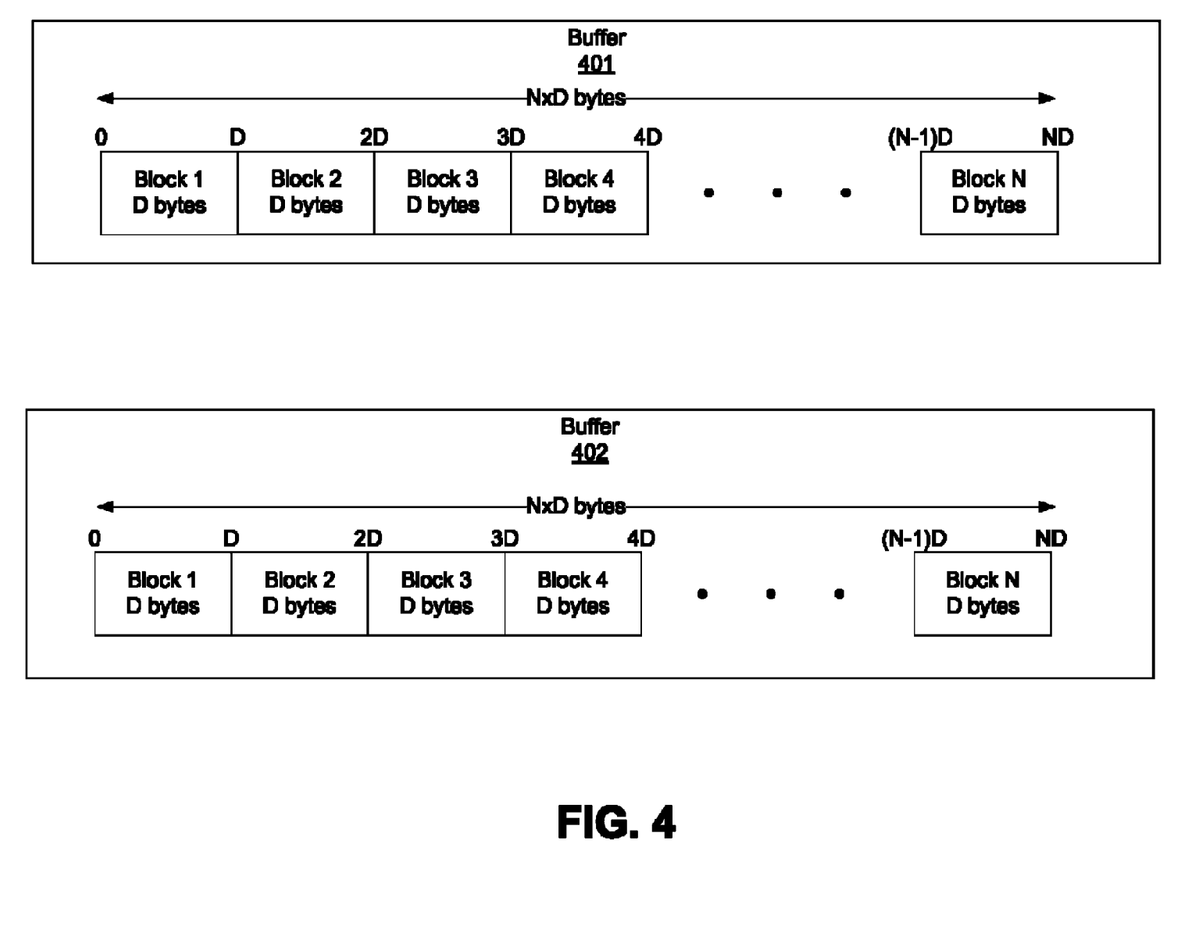
FIG. 4 illustrates a multi-buffer arrangement in accordance with example embodiments of the disclosure.

FIG. 4 illustrates a multi-buffer arrangement in accordance with example embodiments of the disclosure. Depicted are buffer 401 and buffer 402. Each of computing device 102 and 104 may implement the buffers in memory 205 (e.g., RAM, ROM, FLASH, etc.). Buffers 401 and 402 may store data of a file read from and/or being written to the storage device 203. Although only two buffers are shown, more than two buffers may be implemented. To read a file, the sending computing device 102 may determine a unique identifier indicating a beginning location of the file stored on the recording medium 302. The recording medium 302 may sequentially store all of the data for the file starting at that location so that the data is not fragmented when stored. By avoiding fragmenting the file, this permits the read/write head 304 to read data while moving in a single direction along the recording medium 302 without requiring performance of unnecessary seek operations.

In an example where the file is written on a single track, the actuator arm 306 may remain at a fixed position as the recording medium 302 rotates during which the read/write head 304 reads all of the data for the file. Thus, the storage device 203 may perform only a single seek operation to position the read/write head 304 to read from a particular track and sector on the recording medium 302. In another example where the file data is written on multiple tracks, the actuator arm 306 may remain at a fixed position as the recording medium 302 rotates during which the read/write head 304 reads all of the data for the file on a first track. The actuator arm 306 may adjust the location of the read/write head 304 to read data of the file from a second track, and so forth. Thus, the storage device 203 may only perform as many seek operations as tracks on which the file is written. Sequentially storing data in this manner avoids unnecessary delay caused by performing unnecessary seek operations.

With reference to FIG. 3, for example, a file may be written on track 310A of the recording medium between reference numerals 312 and 314. To read the file, the storage device 203 may rotate the recording medium and position the read/write head 304 to read track 310A. As all data of the file is stored between reference numerals 312 and 314 along track 310A, the read/write head 304 may be positioned only once on track 310A to read data stored on the track between reference numerals 312 and 314 as the recording medium 302 rotates without having to reposition the read/write head 304.

In conventional systems, reading a fragmented file, in contrast, would involve determining a beginning location of a first fragment of the file on the recording medium 302, reading the fragment beginning at the first location, identifying an end of the first fragment as well as a beginning location of a next fragment that is on a different track and/or non-adjacent sector of a track, having the actuator arm 306 reposition the read/write head 304 at the beginning location of the next fragment, and so forth for subsequent fragments. In conventional systems, time is therefore lost due to repositioning of the read/write head 304 on the recording medium 302 because the read/write head 304 does not read the file data while being repositioned. For example, if a file were fragmented and a first fragment is recorded on track 310A between reference numerals 312 and 314 and a second fragment is recorded on track 310B between reference numerals 316 and 318, the actuator arm 306 would have to reposition the read/write head 304 from track 310A to 310B to read both fragments to obtain the entire file.

Referring again to an example embodiment and to FIG. 4, the sending computing device 102 may receive an instruction to send a file to the receiving computing device 104 via the network 106. The sending computing device 102 may identify the file and its starting location (e.g., track and sector) on the recording medium 302, and may instruct the storage device 203 to move the read/write head 304 to begin reading of the file.

The read/write head 304 may read a predetermined amount of the file data from the recording medium 302 into buffer 401. For example, the sending computing device 102 may read N blocks of the file data, wherein N may be an integer. Each data block may be of a predetermined size (e.g., D bytes, where D is number). For example, the storage device 203 may instruct the actuator arm 306 to position the read/write head 304 at a particular location of the recording medium 302. The read/write head 304 may read the file data beginning at the starting location and transfer data of the file byte by byte to buffer 401 in the same order the bytes were recorded on the recording medium 302.

Upon providing N×D (N multiplied by D) blocks of data to buffer 401 (unless an end of file marker in the file is reached), the read/write head 304 may continue reading the file data and transfer the next N×D blocks of file data to buffer 402 (unless an end of file marker in the file is reached) byte by byte to buffer 402 in the same order the bytes were recorded on the recording medium 302. Buffer 402 may store a same amount of data as buffer 401 (i.e., N×D blocks of data). The sending computing device 102 may wait to load further file data into either of the buffers until file data previously loaded has been processed by a thread. The sending computing device 102 may load the file data from the storage device 203 up to the end of file marker into one of the buffers. When at least one of the data blocks has been written into one of the buffers 401 or 402, parallel threads may begin processing the data. In an example, a thread may be a unit of computation inside a process. The sending computing device 102 and/or the receiving computing device 104 may include multiple processors where each processor implements one thread, and/or one processor may implement multiple threads.

Figure 5:
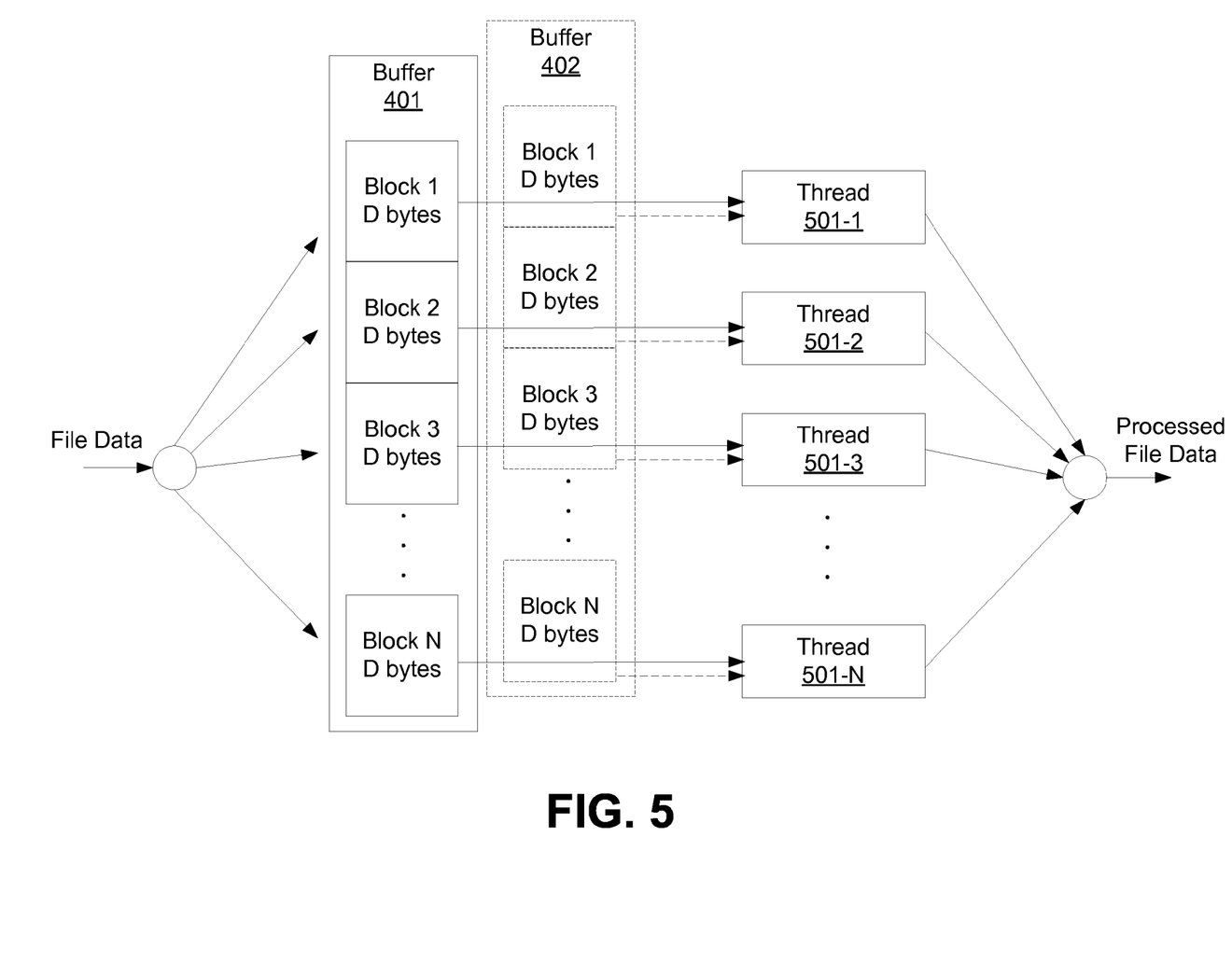
FIG. 5 illustrates an example diagram of multiple threads concurrently processing blocks of file data in accordance with example embodiments of the disclosure.

FIG. 5 illustrates an example logical diagram of multiple threads concurrently processing blocks of file data stored in buffers in accordance with example embodiments of the disclosure. Starting from the left, the sending computing device 102 may load N×D blocks of file data read from the storage device 203 into buffer 401, and then load the next N×D blocks of file data from the storage device 203 into buffer 402. Each of threads 501-1 to 501-N may alternate reading and processing particular blocks of the file data from each buffer. In an example, there may be as many threads as data blocks, or a greater or fewer number of threads relative to data blocks. For example, thread 501-1 may read and process file data stored by block 1 of buffer 401 and then read and process data stored by block 1 of buffer 402, thread 501-2 may read and process file data stored by block 2 of buffer 401 and then read and process data stored by block 2 of buffer 402, and so forth. Buffer 401 is shown with solid lines and Buffer 402 is shown with dashed lines to indicate the alternative nature of reading and processing by the threads. A block of file data in each buffer may correspond to a certain range of bytes of the file each thread is assigned to process. Thread 501-1 may be assigned to process bytes 0 to D of block 1 in each of buffers 401 and 402, thread 501-2 may be assigned to process bytes D+1 to 2*D of block 2 in each of buffers 401 and 402, and so forth.

When a particular thread has finished processing a block of one buffer, that thread may inform the processor 201 to cause the processor 201 to instruct the storage device 203 to load additional data of the file into that block. For example, thread 501-1 may inform the processor 201 of completion of processing block 1 of buffer 401, and the processor 201 may instruct the storage device 203 to load the next file data into block 1 of buffer 401. The processor 201 may then schedule the thread to begin processing of a data block in the same buffer if there is a block that has not yet been assigned to a thread, or in the other buffer. For example, the processor 201 may instruct thread 501-1 to begin processing block 1 of buffer 402. In another example, threads 501-1 to 501-N may be randomly assigned to process any of the blocks in either buffer, based on availability of a thread to process a block.

The processor 201 may delay scheduling a thread to begin processing of a data block in a buffer if unprocessed file data has yet to be loaded in that block. For example, the processor 201 may wait to schedule thread 501-1 to begin processing of block 1 in buffer 402 until the read/write head 304 completes writing of new file data to block 1 of buffer 402. When the end of file marker is identified, the processor 201 may not schedule any further threads to process the buffers after the thread processing the data block in the buffer having the last of the file data.

The processor 201 may thus schedule each thread to process corresponding blocks in buffers 401 and 402 until all of the file data has been processed. The sending computing device 102 may thus alternate loading of N×D blocks of data from a file into buffers 401 and 402 for processing by threads 501-1 to 501-N in parallel until an end of file marker is detected indicating that the end of the file data has been reached. The phrase "in parallel" may indicate that multiple threads may be processing data blocks of a same buffer at the same time (or at least some of the threads may be processing data of a same buffer during a particular time interval).

When processing a block of data, a thread may form the file data of a particular block into packets and assign sequencing information to each of the packets. The sequencing information may indicate a location of the file data within the file so that the file data can be organized into the proper sequence upon receipt. Each thread may cause the sending computing device 102 to output the packets for transport to the receiving computing device 104 via the network 106.

Prior to communicating with the receiving computing device 104 via network 106, the sending computing device 102 may initiate a handshake with the receiving computing device 104 and indicate a number of bytes of data of the file that are being sent. In an example, the sending computing device 102 may asynchronously communicate the packets to the receiving computing device 104. Upon receipt, the receiving computing device 104 may extract the file data blocks from the packets and may process the file data blocks by multiple threads in parallel for writing to a storage device 203 using a multi-buffer arrangement, as further described below.

Figure 6:
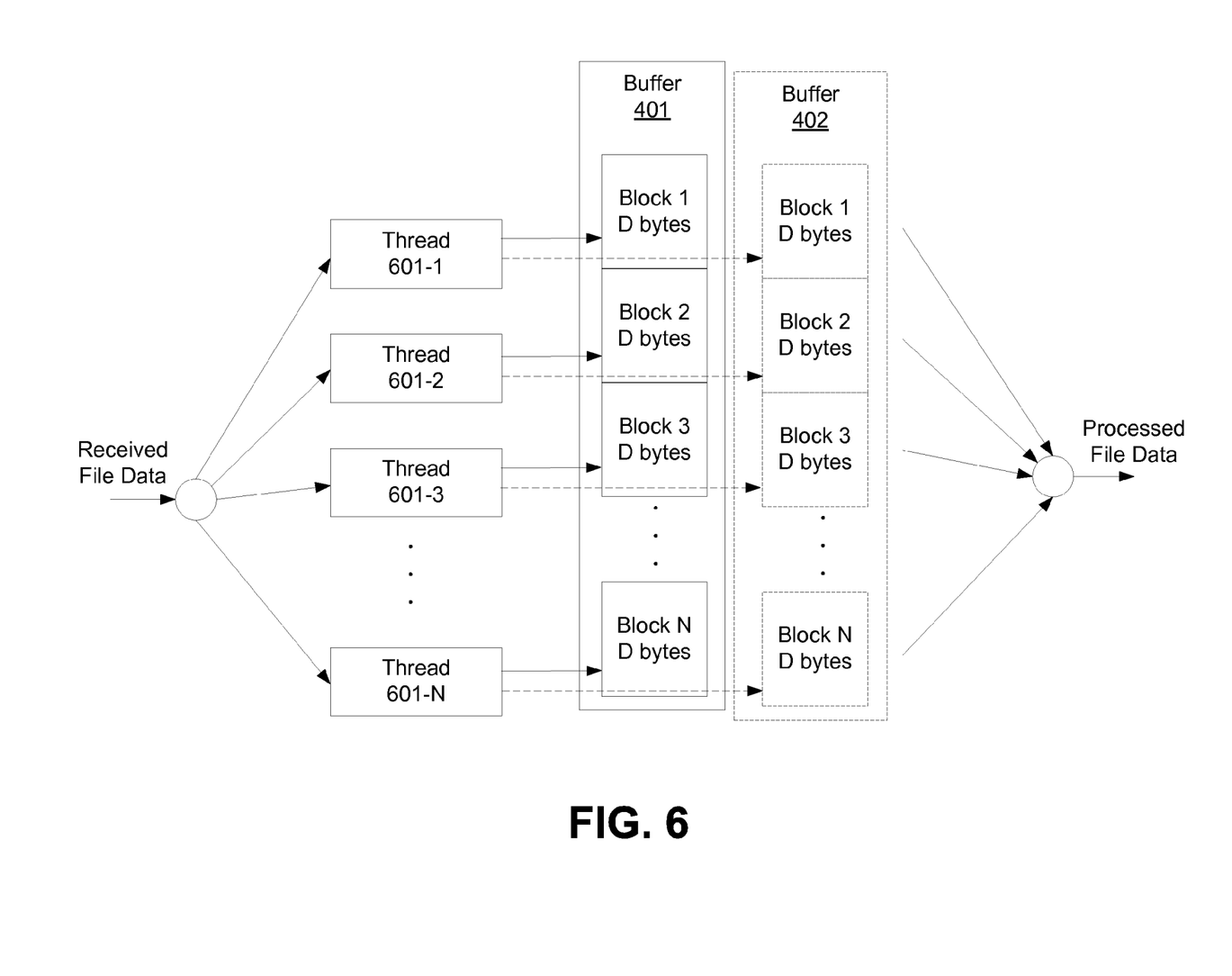
FIG. 6 illustrates an example multi-buffer arrangement for parallel thread processing of data in accordance with example embodiments of the disclosure.

FIG. 6 illustrates an example multi-buffer arrangement for parallel thread processing of data for writing to a storage device in accordance with example embodiments of the disclosure. As file data is received from the network 106, processor 201 of the receiving computing device 104 may schedule a set of threads 601 for processing the file data in parallel for writing the processed file data to a storage device 203. The receiving computing device 104 may queue the received file data and, as a thread becomes available, processor 201 may assign that thread to process a portion of the received file data. A thread may process the sequencing information in the packets to determine where in buffer 401 or 402 to place the received file data in the correct order. For example, file data to be written to block 1 may be received after file data to be written to block 3, but thread 601-1 may place the file data to be written to block 1 in block 1 of buffer 401 and thread 601-3 may place file data to be written to block 3 in block 3 of buffer 401, regardless of when blocks 1 and 3 were received.

In an example, the file data placed in buffer 401 or 402 may be placed in the proper sequential order so that the read/write head 304 may sequentially write the file data byte by byte to a track of the recording medium 302. Once the track is completely filled and if there is more data to write, the read/write head 304 may be repositioned to a different track and may continue sequentially writing the file data. This process may continue until a last of the file data has been written, and, at that time, the read/write head 304 may write an end of file marker at the end of the sequentially written file data. If the file data is written on multiple tracks, the read/write head 304 may also write a pointer on the recording medium 302 identifying a beginning location of a next track where the sequentially written file data continues.

When a thread completes processing previously assigned file data, processor 201 may place the thread at an end of an assignment queue. When no other threads are before the thread in the queue, processor 201 may assign subsequently received file data to that thread. The processor 201 may assign threads to process the received file data until there is no more file data to assign. The processor 201 may determine that there is no more data to be assigned based on sequencing information in the received packets indicating that a particular packet is last in the sequence, when all preceding packets in the sequence have also been received. In another example, processor 201 may determine that there is no more data to be received when the number of bytes of data being sent specified in the handshake has been received. In a further example, processor 201 may cause the receiving computing device 104 to send a message to the sending computing device 102 requesting that a packet be resent should processor 201 determine that a packet is missing based on the sequencing information.

The threads 601 may alternate between writing of received file data to buffers 401 and 402. In an example, there may be a fewer or greater number of threads than blocks in buffer 401 or buffer 402. In another example, the processor 201 may determine that buffer 401 corresponds to a first data range of N×D blocks and buffer 402 corresponds to a second data range of N×D blocks. The threads 601 may write to the buffers 401 and 402 based on the sequencing information such that the file data stored in the buffers 401 and 402 is in the correct sequential order. The threads 601 may process the sequencing information to order the received file data in the correct order when writing to buffers 401 and 402.

The processor 201 may track which blocks of each buffer have been filled with file data. For example, processor 201 may determine that threads have been assigned to write to blocks 1 through N−1 of buffer 401. When a packet or packets carrying the file data for block N is received, processor 201 may assign a next available thread to write to block N of buffer 401.

The processor 201 may then assign threads that subsequently become available to begin writing to the blocks of buffer 402. Once threads have been assigned to write to a last of the blocks in buffer 402, assuming there is more data to be received and the data from buffer 401 has been written to the storage device 203, processor 201 may then begin assigning threads to write to the blocks of buffer 401. In this manner, processor 201 may assign the threads such that they alternate back and forth between writing to buffer 401 and buffer 402.

Prior to writing to a particular block in buffer 401 or 402, processor 201 may confirm that buffer 401 or 402 is ready to receive data at that block (e.g., data was previously written to the recording medium and/or can be overwritten). If so, processor 201 may schedule a thread to write to that block. If not, processor 201 may delay the scheduling until that block is ready to receive data. For example, when thread 601-1 has finished writing to block 1 of buffer 401, thread 601-1 may request to write data in block 1 of buffer 402. The processor 201 may delay or instruct thread 601-1 to write to block 1 of buffer 402 based on whether block 1 of buffer 402 is ready to receive data.

Once a thread has written to its block in either buffer, that thread may inform processor 201 that a particular block is ready for transfer to storage device 203. For example, thread 601-1 may inform processor 201 that D bytes of file data have been transferred to block 1 of buffer 401.

Once threads 601-1 to 601-N have written to all of the blocks for one of the buffers (i.e., N×D blocks of file data), processor 201 may transfer the blocks of buffered file data in sequential order to the storage device 203 beginning at a first byte of block 1 of the buffer and continuing through a last byte of block N of the buffer. For example, thread 601-1 may write D bytes of file data to block 1 of buffer 401, thread 601-2 may write D bytes of file data to block 2 of buffer 401, and so forth until each thread has filled its corresponding block of buffer 401 (or until there is no more data to write to buffer 401). The processor 201 may transfer block 1, followed by block 2, and so forth of buffer 401 to the storage device 203 for writing blocks 1-N on the recording medium 302 in the same order as blocks 1-N are stored in buffer 401. Thus, the storage device 203 may write the data blocks to the recording medium 302 in the same order the data blocks were stored in each buffer.

In an example, processor 201 may transfer blocks of data from one of the buffers 401 and 402 to the storage device 203 in sequential order as each block is completely filled or may wait until a buffer 401 or 402 is completed filled. For example, processor 201 may transfer block 1 of buffer 401 to the storage device 203 as soon as block 1 is filled, followed by transferring block 2 of buffer 401 to the storage device 203 after block 1 is transferred and as soon as block 2 is filled, and so forth until block N is filled and transferred. The processor 201 may then proceed to transfer block 1 of buffer 402 to the storage device 203 as soon as block 1 is filled, followed by transferring block 2 of buffer 402 to the storage device 203 after block 1 is transferred and as soon as block 2 is filled, and so forth until block N of buffer 402 is filled and transferred. The processor 201 may alternate between transferring of the data blocks from each buffer until reaching the end of the file data.

When writing data blocks to the recording medium 302, the storage device 203 may attempt to place all of the file data on a single track. For example, processor 201 may determine a size of the file to be written, and may query the storage device 203 to identify any track on the recording medium 302 having sufficient space to store the entire file. If the file is too large to be written on any single track, processor 201 may query the storage device to identify if there are two adjacent tracks with sufficient space to store the file. This process may continue until a minimum number of adjacent tracks have been identified to store the entire file.

Once a location on the recording medium 302 has been identified, the storage device 203 may move the read/write head 304 to that location and begin sequentially writing N×D byte amounts of the file data from buffer 401 or 402 in a single direction along the track of the recording medium 302. For example, with reference to FIG. 3, the read/write head 304 may determine to write the file data beginning at reference numeral 312 on track 310A and continuing writing along the arc of track 310A toward reference numeral 314 as the recording medium rotates in a counter clockwise direction (see reference numeral 320).

When the read/write head 304 finishes writing a particular N×D byte amount of file data from one of the buffers, the read/write head 304 may begin writing a next N×D byte amount of file data from the other of the buffers adjacent to the previous N×D byte amount in the same direction until all of the file data has been written. For example, the read/write head 304 may sequentially write all of the data blocks from buffer 401 and then begin sequentially writing all of the data blocks from buffer 402. Block N of buffer 401 may be written adjacent to block 1 of buffer 402 on the recording medium 302. When there is no more data, the read/write head 304 may include an end of file marker on the recording medium 302 to denote the end of the file (e.g., at reference numeral 314). If the file data is stored on multiple tracks, the read/write head 304 may also insert a pointer at the end of the file data on one track pointing to a beginning location of the data on another track.

The read/write head 304 may thus sequentially write all of the data blocks for a file adjacent to one another in a single direction on a same track, thereby not requiring the read/write head 304 to unnecessarily move to a non-adjacent sector on the same track. If all of the file data is written on a single track, the read/write head 304 may only have to perform a single seek operation as all of the file data is stored in an unfragmented manner on the recording medium 302. In another example, the storage device 203 may minimize the number of different tracks on which the file data is stored, and may store the file data on each track in an unfragmented manner. This example may only involve a single seek operation per track on which the file data is written.

Further, the read/write head 304 may write on the recording medium 302 moving in a single direction without having to interrupt writing to move to a different location on a same track within the recording medium 302. When the entire file data is written on a single track, the example embodiments might not require maintaining information about the different starting and ending locations of multiple file fragments on the same track. When written on multiple tracks, the example embodiments may only require a single seek operation per track on which the file data is written. The example embodiments therefore provide improved reading and writing to a recording medium of data concurrently processed by threads while eliminating or reducing unnecessary movement of the read/write head caused by file fragmentation.

Figure 7:
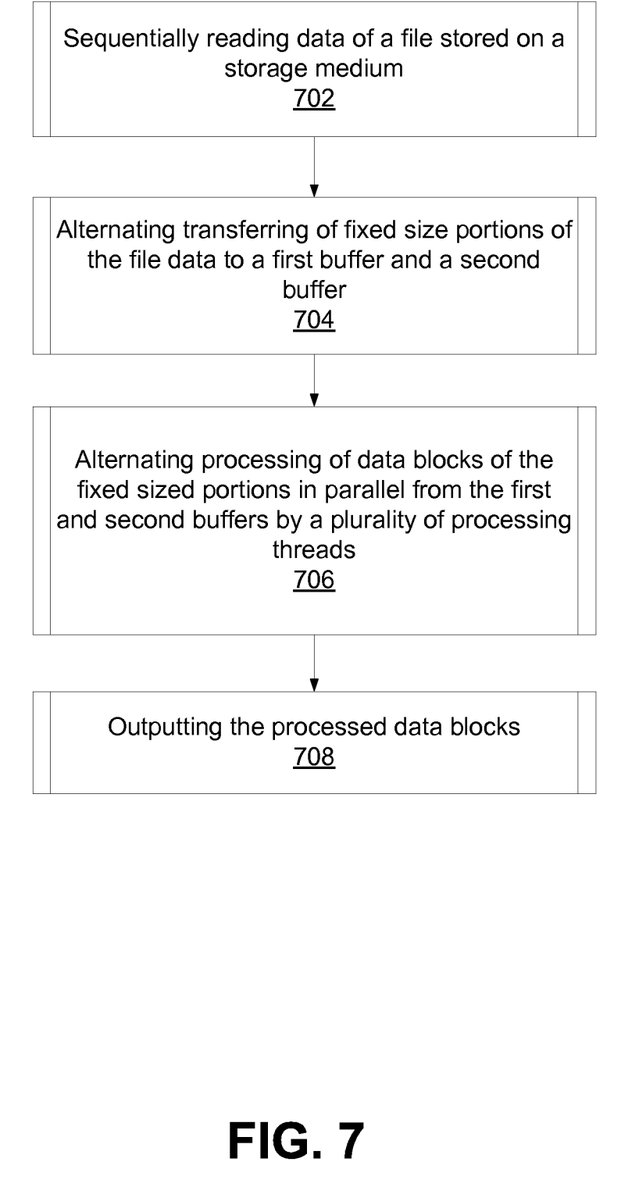
FIG. 7 illustrates a flow diagram of an example method for reading file data in accordance with example embodiments of the disclosure.

FIG. 7 illustrates a flow diagram of an example method for reading file data in accordance with example embodiments of the disclosure. FIG. 7 may be implemented by a computer, such as, for example, the sending computing device 102, or other apparatus. The order of the steps shown in FIG. 7 may also be rearranged, additional steps may be included, some steps may be removed, and some steps may be repeated one or more times. The method may begin at 702.

In 702, the method may include sequentially reading, by a computing device, data of a file stored on a storage medium. For example, processor 201 of a computing device 102 may instruct a read/write head 304 of storage device 203 to identify a beginning location on a track 310 of where a file is located on a recording medium 302 and to begin sequentially reading the file data along the track 310.

In 704, the method may include alternating transferring of fixed size portions of the file data to a first buffer and a second buffer. For example, storage device 203 may transfer a first N×D blocks of the file to buffer 401, a next N×D blocks of the file to buffer 402, alternating of the transferring of subsequent N×D blocks of the file back and forth to buffers 401 and 402 until reaching an end of the file.

In 706, the method may include alternating processing of data blocks of the fixed sized portions in parallel from the first and second buffers by a plurality of processing threads. For example, in parallel, thread 501-1 may process block 1 of buffer 401, thread 501-2 may process block 2 of buffer 401, and so forth through thread 501-N may process block N of buffer 401. After completing of processing the file data stored in buffer 401, threads 501-1 to 501-N may respectively process blocks 1-N of buffer 402 in parallel. The threads 501-1 to 501-N may alternate processing blocks from buffers 401 and 402 until all data of the file has been processed. The sending computing device 102 may also randomly assign each of the threads to process any unprocessed data blocks within either buffer. Also, there may be a fewer or greater number of threads relative to the number of blocks in buffer 401 or buffer 402.

In 708, the method may include outputting the processed data blocks. For example, the sending computing device 102 may transmit packets containing all or portions of data blocks to a network interface for transfer to a receiving computing device 104 via network 106. The threads may include the file data and sequencing information in packets to permit ordering of the processed file data upon receipt into the same order in which the packets were sent. The method may then end or may return to any of the preceding steps.

Figure 8:
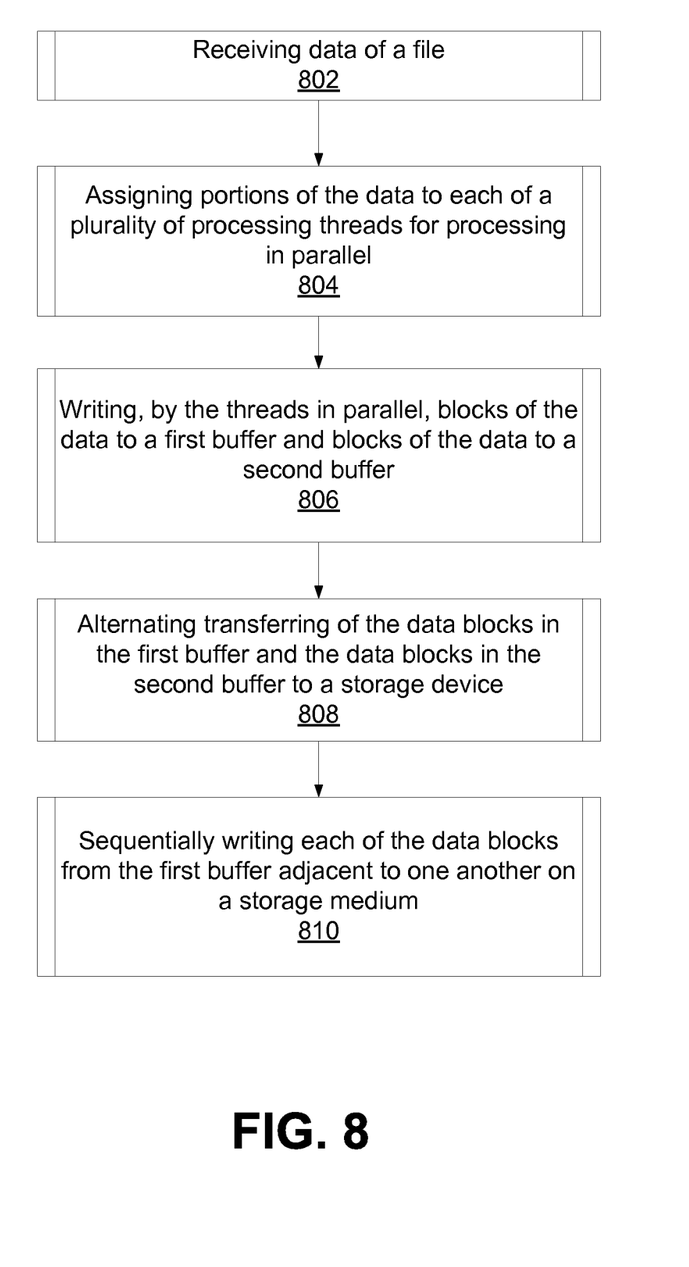
FIG. 8 illustrates a flow diagram of an example method for writing blocks of file data to a storage device in accordance with example embodiments of the disclosure.

FIG. 8 illustrates a flow diagram of an example method for writing file data to a storage device in accordance with example embodiments of the disclosure. FIG. 8 may be implemented by a computer, such as, for example, the receiving computing device 104 or other apparatus. The order of the steps shown in FIG. 8 may also be rearranged, additional steps may be included, some steps may be removed, and some steps may be repeated one or more times. The method may begin at 802.

In 802, the method may include receiving data of a file. For example, the receiving computing device 104 may receive packets sent by sending computing device 102 via network 106 a network interface, where the packets contain data of a file and sequencing information.

In 804, the method may include assigning portions of the data to each of a plurality of processing threads for processing of the assigned portions by the respective threads in parallel, each of the threads being implemented by at least one processor.

In 806, the method may include writing, by the threads in parallel, blocks of the data to a first buffer and blocks of the data to a second buffer. For example and with reference to FIG. 6, threads 601-1 to 601-N may respectively write assigned portions of the received data to data blocks in buffer 401 and to data blocks in buffer 402.

In 808, the method may include alternating transferring of the data blocks in the first buffer and the data blocks in the second buffer to a storage device. For example, the receiving computing device 104 may transfer the data contained in blocks 1-N of buffer 401 to the storage device 203, followed by the data contained in blocks 1-N of buffer 402 to the storage device 203.

In 810, the method may include sequentially writing, by the storage device, each of the data blocks from the first buffer adjacent to one another on a storage medium. For example, the read/write head 304 of the storage device 203 may write block 1 of buffer 401 to the recording medium 302, followed by block 2 of buffer 401 after finishing writing of block 1, and so forth until having written block N of buffer 401. Once all of the blocks of data from buffer 401 have been written, the read/write head 304 may then write block 1 of buffer 402 on the recording medium 302 adjacent to block N of buffer 401, block 2 of buffer 402 adjacent to block 1 of buffer 402, and so forth. The read/write head 304 may alternate writing data blocks from buffers 401 and 402 until all of the data of a file has been written. The read/write head 304 may then record an end of file marker on the recording medium 302 at the end of the file. The method may then end or may return to any of the preceding steps.

Therefore, the example embodiments may be used in any application that reads or writes data on storage devices using parallel threads. Further, by including an end of file marker at the end of the file data being written to the recording medium, the example embodiments eliminate the issue of having to write after receipt of the end of file marker, in contrast with conventional systems.

Any of the above-mentioned functional components may be implemented with at least one processor and at least one memory. The functional components may include hardware that may execute software and/or be configured in hardware to perform specific functions. The software may be stored on a computer-readable medium in the form of computer-readable instructions. A computer may read those computer-readable instructions, and in response perform various steps as defined by those computer-readable instructions. Thus, any functions attributed to any of the components of FIG. 1 as described herein may be implemented, for example, by reading and executing such computer-readable instructions for performing those functions, and/or by any hardware subsystem (e.g., a processor) from which the computer is composed.

While embodiments have been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

The invention claimed is:

1. A method comprising:
   assigning, by a computing device, portions of received data to parallel threads; and
   alternating writing a first block of the received data in a sequential order to a first buffer and a second block of the received data in the sequential order to a second buffer.

2. The method of claim 1, further comprising:
   writing from the first buffer and from the second buffer to a first track of a storage medium the received data in the sequential order until the first track is filled.

3. The method of claim 2, further comprising:
   during the writing from the first buffer and from the second buffer to the first track of the storage medium the received data, maintaining a fixed position of a write/read head of the storage medium; and
   in response to a determination that the first track is filled, writing from the first buffer and from the second buffer to a second track of the storage medium at least one block of the received data in the sequential order until at least one of:
      a last block of the received data is written to the second track, and
      the second track is filled, wherein the second track of the storage medium is adjacent to the first track of the storage medium.

4. The method of claim 2, wherein the writing from the first buffer and from the second buffer to the first track of the storage medium the received data in the sequential order further comprises writing each block of the received data adjacent to one another on the first track.

5. The method of claim 2, wherein the writing from the first buffer and from the second buffer to the first track of the storage medium the received data in the sequential order further comprises writing to the first track an initial block from the second buffer adjacent to a last block from the first buffer.

6. The method of claim 2, further comprising:
   initiating the writing from the first buffer and from the second buffer to the first track of the storage medium the received data in the sequential order when at least one of the first buffer and the second buffer is filled.

7. The method of claim 1, further comprising receiving the received data in a non-sequential order.

8. The method of claim 1, wherein each block of the received data has a size equal to another block of the received data.

9. A method comprising:
   determining, by a computing device, a minimum number of adjacent tracks of a storage medium to store received data; and
   alternating writing a first block of the received data in a sequential order to a first buffer and a second block of the received data in the sequential order to a second buffer.

10. The method of claim 9, further comprising:
    writing from the first buffer and from the second buffer to a first track of the adjacent tracks the received data in the sequential order until the first track is filled.

11. The method of claim 10, further comprising:
    while the received data is written from the first buffer and from the second buffer to the first track, maintaining a fixed position of a write/read head of the storage medium; and
    writing from the first buffer and from the second buffer to a second track of the adjacent tracks at least one block of the received data in the sequential order until at least one of:
       a last block of the received data is written to the second track, and
       the second track is filled, wherein the second track is adjacent to the first track of the storage medium.

12. The method of claim 10, wherein the writing from the first buffer and from the second buffer to the first track of the adjacent tracks the received data in the sequential order further comprises writing each block of the received data adjacent to one another on the first track.

13. The method of claim 10, wherein the writing from the first buffer and from the second buffer to the first track of the adjacent tracks the received data in the sequential order further comprises writing to the first track an initial block from the second buffer adjacent to a last block from the first buffer.

14. The method of claim 10, further comprising:
    initiating the writing from the first buffer and from the second buffer to the first track of the adjacent tracks the received data in the sequential order when at least one of the first buffer and the second buffer is filled.

15. The method of claim 9, further comprising receiving the received data in a non-sequential order.

16. The method of claim 9, wherein each block of the received data has a size equal to another block of the received data.

17. A method comprising:
    writing, by a computing device, from a first buffer and from a second buffer a plurality of data blocks to a first track of a storage medium in a sequential order until the first track is filled.

18. The method of claim 17, further comprising:
    assigning the plurality of data blocks to parallel threads; and
    alternating writing a first data block of the plurality of data blocks in the sequential order to the first buffer and a second data block of the plurality of data blocks in the sequential order to the second buffer.

19. The method of claim 18, further comprising:
    assigning a particular thread of the parallel threads to write a first particular data block to the first buffer; and
    reassigning the particular thread to write a second particular data block to the first buffer after the first particular data block has been written to the first buffer.

20. The method of claim 17, further comprising:
    determining whether the first track of the storage medium has sufficient space available to store the plurality of data blocks.

\* \* \* \* \*